United States Patent
Schmidt

(10) Patent No.: US 9,601,815 B2
(45) Date of Patent: Mar. 21, 2017

(54) BATTERY SYSTEM HAVING BATTERY CELLS AND AN APPARATUS FOR CONTROLLING THE TEMPERATURE OF THE BATTERY CELLS

(71) Applicants: Robert Bosch GmbH, Stuttgart (DE); Samsung SDI Co., Ltd., Yongin-si, Gyeonggi-do (KR)

(72) Inventor: Achim Schmidt, Hamburg (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 191 days.

(21) Appl. No.: 14/161,443

(22) Filed: Jan. 22, 2014

(65) Prior Publication Data

US 2014/0205875 A1    Jul. 24, 2014

(30) Foreign Application Priority Data

Jan. 24, 2013   (DE) ................. 10 2013 201 096

(51) Int. Cl.
*H01M 10/613*    (2014.01)
*H01M 2/10*      (2006.01)
(Continued)

(52) U.S. Cl.
CPC ..... *H01M 10/5004* (2013.01); *H01M 2/1077* (2013.01); *H01M 10/613* (2015.04); *H01M 10/625* (2015.04); *H01M 10/647* (2015.04); *H01M 10/6555* (2015.04); *H01M 10/6556* (2015.04)

(58) Field of Classification Search
CPC ............. H01M 2/1077; H01M 10/625; H01M 10/613; H01M 10/6556; H01M 10/6555; H01M 10/647
See application file for complete search history.

(56) References Cited

U.S. PATENT DOCUMENTS

2009/0208829 A1    8/2009  Howard et al.
2011/0027625 A1*   2/2011  Payne ............... H01M 10/5004
                                                     429/50
(Continued)

FOREIGN PATENT DOCUMENTS

CN    102064291 A    5/2011
CN    102257653 A    11/2011
(Continued)

*Primary Examiner* — Brittany Raymond
(74) *Attorney, Agent, or Firm* — Maginot, Moore & Beck LLP

(57) ABSTRACT

A battery system includes a plurality of battery cells connected to one another and includes an apparatus configured to control the temperature of the plurality of battery cells. The apparatus includes at least one hollow body through which a coolant flows and includes at least one heat conducting element having at least one first contact region and at least one second contact region. The at least one first contact region has a planar configuration and is in thermal contact with a side face of at least one battery cell of the plurality of battery cells. The at least one second contact region is arranged on the at least one hollow body such that the at least one second contact region is in thermal contact with the at least one hollow body.

9 Claims, 2 Drawing Sheets

Section A-A

(51) Int. Cl.
*H01M 10/625* (2014.01)
*H01M 10/647* (2014.01)
*H01M 10/6556* (2014.01)
*H01M 10/6555* (2014.01)

(56) References Cited

U.S. PATENT DOCUMENTS

2011/0212356 A1    9/2011  Tennessen et al.
2011/0262792 A1*  10/2011  Lee .................... H01M 2/1077
                                              429/120

FOREIGN PATENT DOCUMENTS

| CN | 102473980 A | 5/2012 |
| DE | 10 2007 050 400 A1 | 4/2009 |
| DE | 10 2008 059 954 A1 | 6/2010 |
| DE | 10 2009 039 394 A1 | 3/2011 |

\* cited by examiner

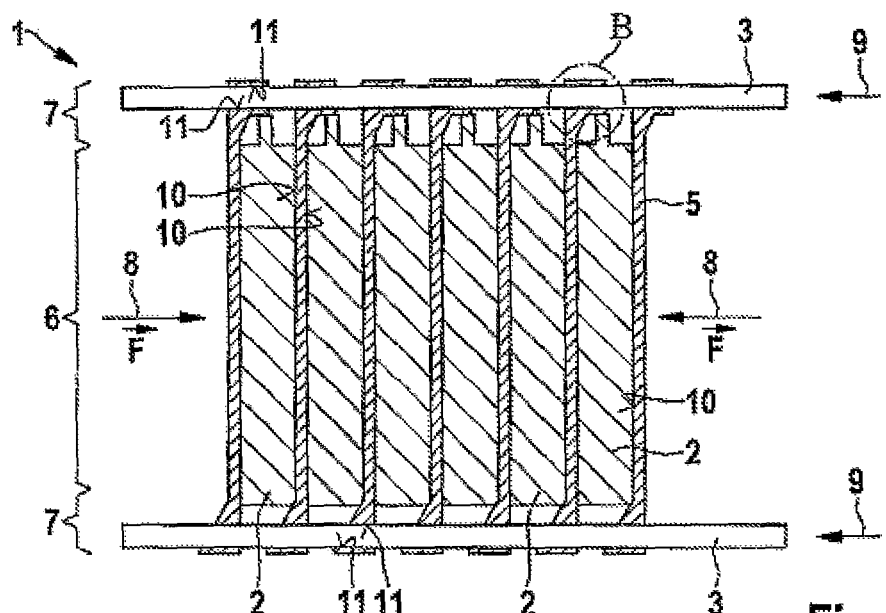
Fig. 1a
Section A-A
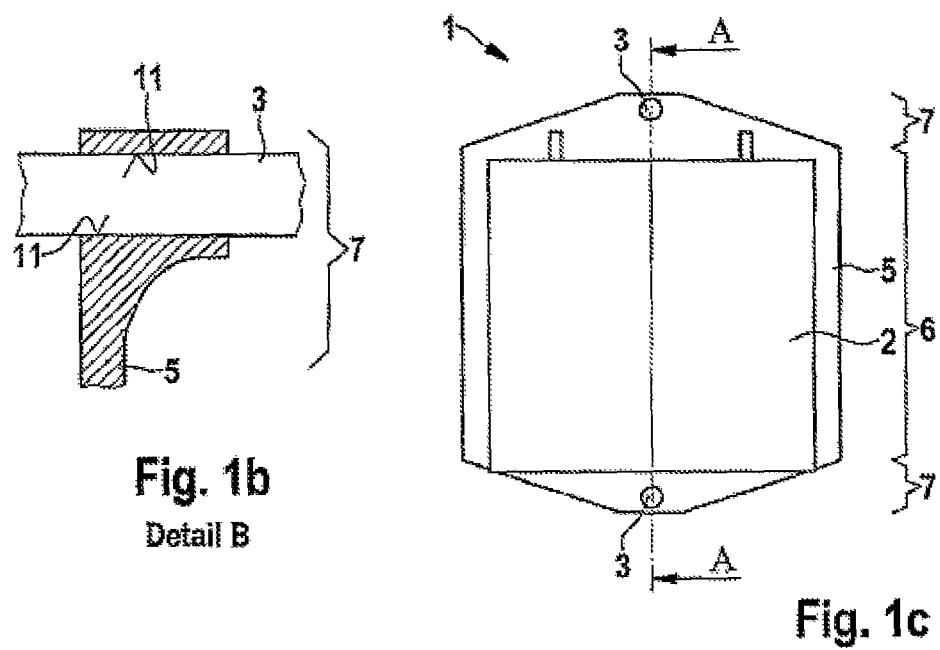
Fig. 1b
Detail B
Fig. 1c

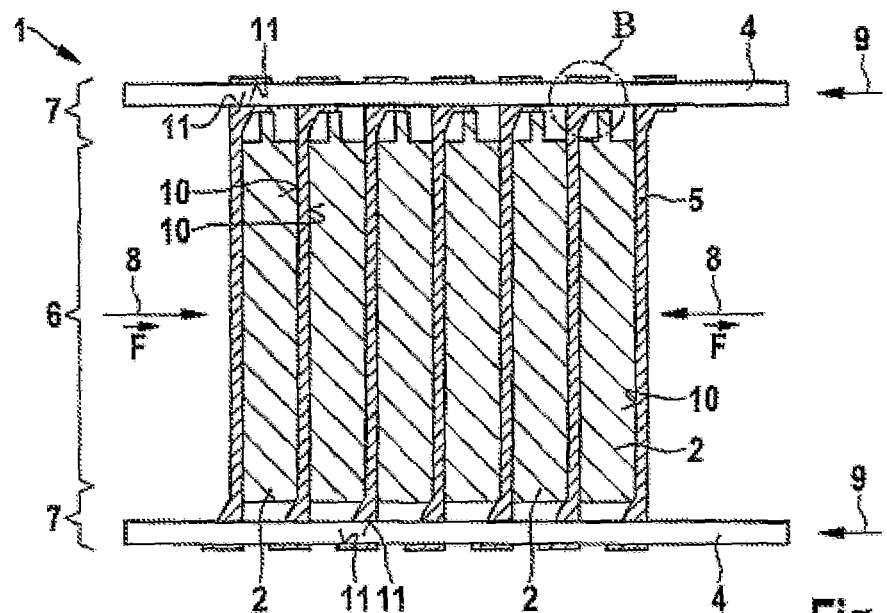
Fig. 2a
Section A-A
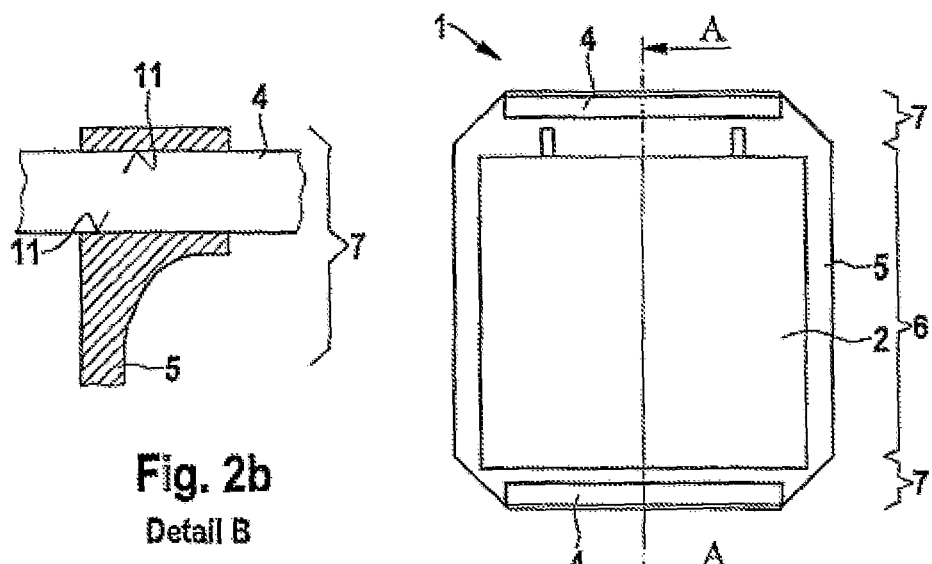
Fig. 2b
Detail B
Fig. 2c

BATTERY SYSTEM HAVING BATTERY CELLS AND AN APPARATUS FOR CONTROLLING THE TEMPERATURE OF THE BATTERY CELLS

This application claims priority under 35 U.S.C. §119 to patent application number DE 10 2013 201 096.6, filed on Jan. 24, 2013 in Germany, the disclosure of which is incorporated herein by reference in its entirety.

BACKGROUND

The disclosure relates to a battery system having a plurality of battery cells which are connected to one another and having an apparatus for controlling the temperature of the battery cells, which apparatus comprises at least one hollow body, through which a coolant flows, and at least one heat conducting element having at least one first contact region and having at least one second contact region, the at least one first contact region being of planar configuration and being in thermal contact with the side face of at least one battery cell.

Batteries, such as, in particular, rechargeable lithium-ion batteries, are of great significance as energy stores, in particular in order to provide the energy which is necessary for the drive in hybrid, plug-in hybrid or electric vehicles. Lithium-ion batteries are constructed from a plurality of battery cells which are connected electrically to one another, it being possible for a plurality of battery cells to be braced mechanically with one another to produce a battery module. For safe operation of batteries of this type and for use of batteries of this type which is optimized, in particular, with regard to the performance and the service life, it has to be ensured that the batteries are used only in a defined temperature range. Thus, heating of the battery cells beyond a defined temperature has to be avoided, in particular in the case of high power input or high power output, in particular in order not to shorten the service life of the battery cells and to avoid what is known as a "thermal runaway" of the battery cells.

For this reason, the batteries or the battery cells are usually temperature-controlled. Here, battery systems which were mentioned at the outset are known which have an apparatus for controlling the temperature of the battery cells. In particular, cooling plates are used as apparatus for temperature control, a cooling plate of this type being in thermal contact via a contact area with the battery cells of the battery, in particular by the battery cells being arranged on the cooling plate. In this way, the transmission of thermal energy takes place between the contact area of a cooling plate and the battery cells. In addition, in order to improve the cooling action of the battery cells, a cooling pipe, through which a coolant flows, can be arranged below the cooling plate. A battery having a cooling plate of this type is known from document DE 10 2008 059 954 A1.

It is a disadvantage of this abovementioned type of temperature control of the battery cells that the battery cells are in thermal contact with the cooling plate only over a comparatively small area, namely the bottom area of the battery cells. However, a satisfactory contact of the battery cells with the contact area is required for a low heat transfer resistance and therefore a satisfactory transmission of thermal energy, in particular in the case of a small contact area. However, this often proves problematic, in particular since the battery cells are usually braced mechanically with one another to form a battery module, and the individual battery cells therefore frequently do not rest in an optimum manner on the contact area of the cooling plate. Here, this leads to a pronounced rise in the heat transfer resistance. Here, the problem is intensified additionally by age-induced deformations of the battery cells and by vibrations and jolts, in particular when battery modules of this type are used in vehicles. These undesired influences can even lead to individual battery cells not being in thermal contact with the apparatus for controlling the temperature of the battery cells. A sufficient temperature control of the relevant battery cells can no longer take place here, as a result of which the battery cells and, as a consequence of this, even the complete battery can be damaged irreparably. Here, the mounting of the battery cells on the cooling plate, which ensures permanently existing thermal contact between the battery cells and the cooling plate, is complicated to realize.

It is therefore desirable to improve the thermal contact of the battery cells with the apparatus for controlling the temperature of the battery cells. Document DE 10 2008 059 954 A1 has already disclosed enlarging the contact area between the battery cells and the cooling plate. In addition to the contact of the bottom area of the battery cells with the cooling plate, heat conducting plates are arranged between the battery cells, the heat conducting plates being connected thermally to the cooling plate, in order to conduct heat from the battery cells to the cooling plate.

Against this background, it is an object of the present disclosure to improve a battery system which was mentioned at the outset, in particular with regard to an improved transmission of thermal energy between the battery cells and the apparatus for controlling the temperature of the battery cells.

SUMMARY

In order to achieve the object, a battery system is proposed having a plurality of battery cells which are connected to one another and having an apparatus for controlling the temperature of the battery cells, which apparatus comprises at least one hollow body, through which a coolant flows, and at least one heat conducting element having at least one first contact region and having at least one second contact region, the at least one first contact region being of planar configuration and being in thermal contact with the side face of at least one battery cell, and the at least one second contact region being arranged on the at least one hollow body in such a way that the at least one second contact region is in thermal contact with the at least one hollow body. The at least one thermal conducting element is advantageously connected directly via the at least one second contact region to the hollow body, through which coolant flows, with the result that an improved transmission of thermal energy between the battery cells and the at least one hollow body, through which coolant flows, takes place.

The at least one hollow body, through which a coolant flows, is preferably a coolant line pipe which is particularly preferably configured as a round pipe. One advantageous configuration variant of the hollow body, through which a coolant flows, is distinguished by a large contact area for making contact with the second contact region of the at least one heat conducting element, with the result that an improved transmission of thermal energy between the at least one hollow body and the at least one heat conducting element takes place. It is provided as one advantageous configuration variant, in particular, that the at least one hollow body is configured in the manner of a plate. A configuration variant of this type represents a special refinement of a coolant line pipe with a substantially rectangular cross section, in which the width of two walls which lie opposite one another is a multiple of the height of two walls which lie opposite one another. It is provided according to one advantageous refinement of the disclosure that the at least one hollow body is made from metal, preferably from copper and/or aluminum.

The at least one heat conducting element is advantageously of passive configuration, that is to say a coolant does not flow through the at least one heat conducting element. As a result of the planar configuration of the at least one first contact region of the at least one heat conducting element, the heat conducting element can advantageously be in thermal contact on both sides, since both the front side and the rear side of the at least one heat conducting element are therefore configured as the contact area for making thermal contact with battery cells. Thus, at least one side face of at least one battery cell can be in thermal contact by means of the one contact area and at least one side face of at least one further battery cell can be in thermal contact by means of the second contact area. It is provided according to one advantageous refinement of the disclosure that the at least one heat conducting element is of planar configuration apart from the at least one second contact region. It is provided, in particular, that the at least one heat conducting element is configured in one piece.

A further advantageous refinement of the battery system according to the disclosure provides that the battery cells are rechargeable battery cells, particularly preferably lithium-ion battery cells. Battery cells of this type are advantageously distinguished by a high energy density. A plurality of battery cells which are connected electrically to one another or the battery which arises from a plurality of battery cells which are connected to one another is preferably configured as an energy source for the drive of hybrid, plug-in hybrid or electric vehicles.

The disclosure is based on the finding that an improved transmission of thermal energy between a battery cell and an apparatus for controlling the temperature of the battery cell can be achieved if a battery cell is in thermal contact with an apparatus for controlling the temperature of battery cells over a large area, advantageously the side face of the battery cell, the thermal contact taking place via at least one heat conducting element which is in thermal contact directly with a coolant-conducting component of an apparatus for controlling the temperature of battery cells, namely preferably a coolant line pipe. The thermal contact via the side face of a battery cell is also particularly advantageous, since the at least one heat conducting element or the heat conducting elements can be arranged with the first contact region between the battery cells. As a result of mechanical bracing of the battery cells to produce a battery module, the heat conducting elements are advantageously fixed between the battery cells here. In addition, the contact pressure on account of the mechanical bracing advantageously ensures a low heat transmission resistance from the battery cells to the respective heat conducting element, as a result of which the transmission of thermal energy is advantageously improved further. In addition, the battery cells are advantageously not arranged on a cooling plate, with the result that the construction of the battery system is simplified. As a result of the direct arrangement of the at least one passive heat conducting element on at least one battery cell and on the at least one hollow body, through which a coolant flows, heat is discharged from the battery cells to the at least one hollow body and is transmitted in a convective manner from the hollow body to the coolant. As a result of the contact of the passive heat conducting elements with the coolant-conducting active element, namely with the at least one hollow body, the transmission of thermal energy can be advantageously improved and a battery or the battery cells of a battery can therefore be temperature-controlled in an improved manner. In addition, a more compact overall shape can advantageously be achieved as a result.

A water-glycol mixture or a refrigerant, such as, in particular, the refrigerant R1234yf, can be provided, for example, as coolant which flows through the at least one hollow body.

One preferred refinement of the disclosure provides that the at least one first contact region is arranged between two battery cells in such a way that the at least one first contact region is in thermal contact with said two battery cells. Therefore, according to the disclosure, a heat conducting element is inserted between two adjacently arranged battery cells, said heat conducting element being in thermal contact on both sides with the adjacently arranged battery cells. Here, the contact with the battery cell takes place via the first contact region of the heat conducting element.

It is provided according to a further preferred refinement of the disclosure that the battery cells are braced mechanically with one another in such a way that a heat conducting element which is arranged between the battery cells is held by the mechanical bracing action. As a result of the mechanical bracing action or the contact pressure which emanates from the mechanical bracing action, improved contact with the at least one heat conducting element which is arranged between two battery cells is advantageously achieved and the heat transmission resistance from the battery cell to the heat conducting element which is in thermal contact is reduced.

The at least one heat conducting element advantageously protrudes beyond the side face of the at least one battery cell which is in thermal contact. Said region of the at least one heat conducting element which protrudes beyond the side face advantageously improves the heat dissipation from the battery cells. This is because thermal energy is additionally dissipated to the surrounding air via the region which protrudes beyond the side face of the battery cells which are in contact. Moreover, this additional region can advantageously be used, in order to attach holding devices thereto in order to fix the battery system in an installation space in a vehicle and/or in a housing. To this end, the corresponding regions of the heat conducting element can preferably have holes and/or holding devices, such as hooks and the like.

According to a further preferred refinement of the disclosure, the at least one second contact region encloses the at least one hollow body at least partially. It is provided as an advantageous configuration variant, in particular, that the at least one second contact region encloses the at least one hollow body completely. As a result of the complete or partial enclosure of the hollow body, the contact area between the at least one hollow body and the at least one heat conducting element is advantageously increased. As a result, an improved transmission of thermal energy between the hollow body, through which coolant flows, and the at least one heat conducting element and therefore between the hollow body, through which coolant flows, and the at least one battery cell which is in thermal contact with the heat conducting element can be achieved. In addition, the at least one hollow body can be held advantageously by heat conducting elements which are fixed between the battery cells if the at least one second contact region of the heat conducting elements encloses the at least one hollow body at least partially.

It is provided according to a further advantageous refinement of the disclosure that the at least one second contact region is connected non-positively to the at least one hollow body. Here, one particularly preferred refinement of the disclosure provides that the at least one second contact region is arranged on the at least one hollow body by being shrunk on or is connected to the at least one hollow body by being shrunk on. The at least one heat conducting element or the at least one second contact region of the at least one heat conducting element is preferably produced to this end with an oversize fit in relation to the at least one hollow body, the at least one heat conducting element being applied to the at least one hollow body after heating of the at least one second contact region. Here, the battery system can advantageously be configured in such a way that the at least one hollow body is held by the at least one heat conducting element. Here, additional measures for holding the at least one hollow body, through which a coolant flows, are advantageously not required. As a result of the non-positive connection between the at least one heat conducting element and the at least one hollow body, the thermal transfer resistance from the hollow body, through which coolant flows, to the at least one heat conducting element is advantageously kept low, as a result of which heat transmission between the battery cells and the hollow body, through which coolant flows, via the at least one heat conducting element is advantageously improved. Since the battery system according to the disclosure is provided, in particular, for use in vehicles, in particular in electric vehicles, shrinking on of the at least one heat conducting element affords the advantage, moreover, that the contact between the at least one hollow body and the at least one heat conducting element is not released as a result of jolts and vibration caused during operation of a vehicle.

In a further refinement of the disclosure, the at least one hollow body is oriented orthogonally with respect to the at least one first contact region. That is to say, the hollow body extends in the direction of the battery cells which are connected one behind another. In the case of a multiplicity of heat conducting elements which are arranged between the battery cells, the thermal contact of said at least one hollow body with the at least one second contact region of the heat conducting elements can advantageously be realized here particularly simply in structural terms. In the case of an abovementioned refinement, in addition, the at least one second contact region is advantageously oriented orthogonally with respect to the at least one first contact region, the at least one second contact region protruding beyond the at least one first contact region. Here, the second contact region is preferably oriented in an L-shaped or T-shaped manner with respect to the at least one second contact region. In this way, the contact area of the at least one second contact region with the at least one hollow body, through which coolant flows, is advantageously increased, with the result that the transmission of thermal energy between the hollow body, through which coolant flows, and the battery cells via the at least one heat conducting element is improved further.

A further advantageous refinement of the disclosure provides that the at least one first contact region is insulated electrically with respect to a battery cell which is in thermal contact. Here, the electrical insulation is advantageously realized by the application of a heat conducting film. Here, the electrical insulation serves for protection when handling the battery system, since the battery cells or the cell housings of the battery cells are not always potential-free. It is provided according to one configuration variant that correspondingly configured varnish is applied to the battery cells and/or the heat conducting elements for electrical insulation. The heat conducting elements are advantageously made from a material which conducts heat satisfactorily, for example copper or aluminum, the heat conducting elements or the battery cells are then preferably being insulated electrically in a corresponding manner.

One advantageous further configuration variant provides that the at least one heat conducting element is an electric insulator. Here, no additional electrical insulation is advantageously required, as a result of which a weight saving can be achieved. The at least one heat conducting element is particularly preferably at least partially made from ceramic. Here, ceramic provides the advantageous properties of high thermal conductivity with poor electrical conductivity.

A further preferred refinement of the disclosure is distinguished by a plurality of heat conducting elements. It is provided, in particular, that every n-th battery cell is in thermal contact with a heat conducting element. Here, the number of heat conducting elements can advantageously be adapted depending on the application. In particular, the higher the thermal load, the more heat conducting elements should be provided. Thus, for example in the case of HEV (hybrid electric vehicle) applications, a high number of heat conducting elements should be provided; a heat conducting element is preferably arranged in each case between adjacent battery cells. A battery system having a plurality of heat conducting elements is particularly preferably provided, a heat conducting element being arranged in each case between at least every second battery cell.

It is provided according to a further particularly advantageous refinement of the disclosure that the apparatus for controlling the temperature of the battery cells has two hollow bodies, through which a coolant flows, and that the at least one heat conducting element has two second contact regions, the second contact regions being arranged on mutually opposite sides of the heat conducting element and the second contact regions being arranged in each case on the hollow bodies in such a way that the hollow bodies are secured by the second contact regions. In particular, two hollow bodies which are configured as coolant line pipes and through which coolant flows are provided, which hollow bodies are arranged above and below the battery cells or in each case on mutually opposite sides of the battery cells, a plurality of heat conducting elements being arranged with in each case a first contact region between two battery cells and a plurality of heat conducting elements having in each case two second contact regions which are arranged on mutually opposite sides of the heat conducting elements, one heat conducting element being arranged with a second contact region on the one of the coolant line pipes and with the further second contact region on the other of the coolant line pipes, with the result that the heat conducting elements are in thermal contact with the coolant line pipes in each case via the second contact regions. As a result, the transmission of thermal energy between the battery cells and the hollow bodies, through which coolant flows, is advantageously improved further.

BRIEF DESCRIPTION OF THE DRAWINGS

Further advantageous details, features and refinement details of the disclosure will be explained in greater detail in conjunction with the exemplary embodiments which are shown in the figures, in which:

FIG. 1a shows a diagrammatic illustration of a longitudinal section of one exemplary embodiment for a battery system according to the disclosure, FIG. 1b shows a diagrammatic illustration of a longitudinal section through a refinement detail of the exemplary embodiment which is shown in FIG. 1a, FIG. 1c shows a diagrammatic illustration of a frontal inner view of the exemplary embodiment which is shown in FIG. 1a, FIG. 2a shows a diagrammatic illustration of a longitudinal section of a further exemplary embodiment for a battery system according to the disclosure, FIG. 2b shows a diagrammatic illustration of a longitudinal section through a refinement detail of the exemplary embodiment which is shown in FIG. 2a, and FIG. 2c shows a diagrammatic illustration of a frontal inner view of the exemplary embodiment which is shown in FIG. 2a.

DETAILED DESCRIPTION

FIG. 1a shows a battery system 1 having a plurality of battery cells 2 which are connected to one another and having an apparatus for controlling the temperature of the battery cells 2, which apparatus comprises two hollow bodies 3, through which a coolant flows, and a plurality of heat conducting elements 5. In the exemplary embodiment which is shown in FIG. 1a, the battery cells are lithium-ion cells which are connected electrically to one another (not shown explicitly in FIG. 1a). The battery system is configured for use as an energy store for the drive in hybrid, plug-in hybrid and/or electric vehicles.

In each case one heat conducting element 5 is arranged between two battery cells 2 and in each case on the outer side face of the battery cells 2 which are arranged on the outside. In the present case, the heat conducting elements 5 are made from ceramic. However, heat conducting elements which are made from aluminum or copper and are coated, in particular, with a varnish which has an electrically insulating action are provided as configuration variants. Each of the heat conducting elements 5 which are shown in FIG. 1a has in each case one first contact region 6 and two second contact regions 7, the first contact region 6 being of planar configuration and being in thermal contact in each case with a side face of the battery cells 2 which surround the heat conducting element 5. As a result of the planar configuration of the first contact region 7, a heat conducting element 5 therefore has in each case two contact areas 10, the contact areas 10 bearing in each case directly against the side faces of the batteries 2. Merely the outer two heat conducting elements 5 are in thermal contact by way of the first contact region 6 with the side face of only one battery cell 2. The battery cells 2 are braced mechanically together with the heat conducting elements 5, for example by means of an electrically insulated sheet-metal strip (not shown explicitly in FIG. 1a). Here, the arrows 8 represent the forces F, by means of which the battery cells 2 are pressed together with the heat conducting plates 5, and which forces F hold the battery system 1 together.

The second contact regions 7 of the heat conducting elements 5 are arranged in each case on one of the hollow bodies 3, through which a coolant flows, for example a water-glycol mixture. The coolant flow through the coolant line pipes 3 is shown symbolically by the arrows 9 in FIG. 1a. The apparatus for controlling the temperature of the battery cells can be used to cool or to heat the battery cells 2, in particular depending on the temperature of the supplied coolant. In the exemplary embodiment which is shown in FIG. 1a, the hollow bodies 3 of the battery system 1 are configured as a coolant line pipe with a round cross section.

Here, a coolant line pipe 3 is arranged above the battery cells 2 and a further coolant line pipe 3 is arranged below battery cells 2, the coolant line pipes being oriented orthogonally with respect to the first contact regions 6 of the heat conducting elements 5. Here, the heat conducting elements 5 enclose by way of the second contact regions 7 in each case the upper and lower coolant line pipe 3 in such a way that the second contact region 7 is in thermal contact in each case with the corresponding coolant line pipe 3. Here, the contact takes place via the contact area 11, with which the second contact region 7 is arranged in each case on one of the coolant line pipes 3.

The heat conducting elements 5 are arranged on the coolant line pipes 3 in each case by the second contact region 7 being shrunk onto the coolant line pipes 3. To this end, at least the second contact regions 7 of the heat conducting elements 5 have been heated, with the result that the inner radius of the opening of the second contact regions 7 which later encloses the coolant line pipe 3 is enlarged. With the utilization of the expansion of the inner radii of the opening of the second contact regions 7, the heat conducting elements 5 have then been applied with the second contact regions 7 to the coolant line pipes 3, with the result that the heat conducting elements 5 are arranged with the second contact regions 7 on the coolant line pipes 3 with an accurate fit after cooling of the second contact regions 7.

Apart from the second contact region 7, the heat conducting elements 5 are of substantially planar configuration and protrude beyond the side face of the battery cells 2 which are in thermal contact. The second contact regions 7 of the heat conducting elements 5 are oriented substantially orthogonally with respect to the first contact region 6 of the heat conducting elements 5, with the result that the second contact regions 7 protrude beyond the first contact region 6 in such a way that the second contact regions 7 are oriented in each case in an L-shaped manner with regard to the first contact region. As a result, the contact area 11, with which the heat conducting elements 5 are in each case in thermal contact with the coolant line pipes 3, is increased, with the result that an improved transmission of heat between the coolant line pipes 3 and the battery cells 2 via the heat conducting elements 5 can take place. In the case of a coolant temperature below the battery cell temperature, there is a temperature gradient here between the battery cells 2 and the hollow bodies 3, with the result that thermal energy is transmitted from the battery cells 2 via the first contact region 6 to the heat conducting elements 5 and is transmitted from the heat conducting elements 5 via the second contact region 7 to the hollow bodies 3 or the coolant which flows through the hollow bodies 3.

FIG. 1b shows the detail which is labeled with the letter B in FIG. 1a on an enlarged scale. Said figure shows a second contact region 7 of a heat conducting element 5, which second contact region 7 is arranged on the coolant line pipe 3 by being shrunk on. Here, the second contact region 7 is in thermal contact with the coolant line pipe 3 via the contact area 11. As a result of the L-shaped angled formation of the second contact region 7, the contact area 11 is enlarged.

FIG. 1c shows an inner view of the exemplary embodiment which is shown in FIG. 1a, in a frontal illustration. A battery cell 2 can be seen here which is in thermal contact by way of the side face which faces away from the observer in FIG. 1c with the first contact region 6 of a heat conducting element 5. Here, the heat conducting element 5 protrudes beyond the side face of the battery cell 2 which is in thermal contact. The two second contact regions 7 of the heat conducting element 5 enclose in each case the hollow bodies 3 which are configured as coolant line pipes, through which coolant flows.

FIG. 2a to FIG. 2c show a further exemplary embodiment for a battery system 1 according to the disclosure. Here, a substantial difference from the exemplary embodiment which is shown in FIG. 1a to FIG. 1c consists in that the hollow body 4, through which coolant flows, in the battery system 1 which is shown in FIG. 2a to FIG. 2c is of plate-like configuration. Here, the hollow body 4, through which coolant flows, represents a special form of a coolant pipe with a rectangular cross section, the width of the mutually opposite outer walls being a multiple of the height of the two opposite outer walls of the hollow body 4. Here, a coolant flows completely through the hollow body 4, as is shown symbolically in FIG. 2a by the arrows 9.

As is also the case in the exemplary embodiment which is explained in conjunction with FIG. 1a to FIG. 1c, the battery cells 2 together with the heat conducting elements 5 which are arranged between the battery cells 2 are braced mechanically with one another. The forces F which press the battery cells 2 and the heat conducting elements 5 together are shown symbolically by the arrows 8 in FIG. 2a. The mechanical bracing of the battery cells not only improves the thermal contact between the battery cells 2 and the heat conducting elements 5, but also, moreover, prevents swelling and/or deforming of the battery cells during operation.

In the present case, the heat conducting elements 5 are made from aluminum, a heat conducting film (not shown explicitly in the figures) being applied to the heat conducting elements 5 for electrical insulation with respect to the battery cells 2 and for a further reduction of the heat transfer resistance from the battery cells 2 to the heat conducting elements 5. The downwardly pointing second contact regions 7 of the heat conducting elements 5 form a base area for the battery system 1. Here, the hollow bodies 4 are secured by the heat conducting elements 5 or by the second contact regions 7 of the heat conducting elements 5.

The battery system 1 can be fixed at those regions of the heat conducting elements 5 which protrude beyond the side faces of the battery cell 2, for example for installation in an installation space in a vehicle. To this end, said edge regions of the heat conducting elements 5 can advantageously have holes and/or holding devices (not shown explicitly in FIG. 2a to FIG. 2c).

The exemplary embodiments which are shown in the figures are shown in each case with two hollow bodies, through which coolant flows. However, further configuration variants are also provided with a different number of hollow bodies, through which coolant flows, in particular one configuration variant with only one hollow body, through which coolant flows, and one configuration variant with four hollow bodies, through which coolant flows, one hollow body preferably being arranged above the battery cells, one hollow body being arranged below the battery cells and in each case one hollow body being arranged to the sides of the battery cells. Here, the selection of the number of hollow bodies preferably takes place depending on the thermal energy which is to be supplied to the battery cells or depending on the thermal energy which is to be discharged from the battery cells. The greater the thermal energy which is to be supplied or discharged, the higher advantageously is the number of hollow bodies, through which coolant flows.

Moreover, the battery system according to the disclosure having a plurality of battery cells and an apparatus for controlling the temperature of the battery cells can advantageously be scaled in a modular manner. In particular, the battery system can also be realized with a higher number of battery cells than shown in the exemplary embodiments, for example with twelve battery cells. It can also be provided, in particular, that battery cells are arranged next to one another in a plurality of rows, with the result that, next to one row of battery cells which is shown, for example, in FIG. 1a or FIG. 2a, two further corresponding rows of battery cells are arranged (not shown in the figures). In a refinement of this type, the heat conducting elements then advantageously have three first contact regions, with the result that a first contact region of a heat conducting element can be arranged in every row of battery cells between two battery cells of the respective row.

The exemplary embodiments which are shown in the figures and are explained in conjunction with said figures serve to explain the disclosure and do not restrict said disclosure.

What is claimed is:

1. A battery system, comprising:
   a plurality of battery cells connected to one another; and
   an apparatus configured to control a temperature of the battery cells, the apparatus including:
   at least one hollow body through which a coolant flows; and
   at least one heat conducting element having at least one first contact region and at least one second contact region,
   wherein the at least one first contact region has a planar configuration and is in thermal contact with a side face of at least one battery cell of the plurality of battery cells,
   wherein the at least one second contact region is arranged on the at least one hollow body such that the at least one second contact region is in thermal contact with the at least one hollow body, wherein:
   one heat conducting element is arranged between at least two battery cells of the plurality of battery cells;
   the at least two battery cells are braced mechanically with one another such that the heat conducting element is held by mechanical bracing action; and
   the at least one first contact region is electrically insulated with respect to a battery cell, which is in thermal contact.

2. The battery system according to claim 1, wherein the at least one first contact region is arranged between two battery cells of the plurality of battery cells such that the at least one first contact region is in thermal contact with said two battery cells.

3. The battery system according to claim 1, wherein the at least one heat conducting element is configured to protrude beyond the side face of the at least one battery cell which is in thermal contact.

4. The battery system according to claim 1, wherein the at least one second contact region is configured to enclose the at least one hollow body at least partially.

5. The battery system according to claim 4, wherein the at least one second contact region is arranged on the at least one hollow body by being shrunk on.

6. The battery system according to claim 1, wherein the at least one hollow body is oriented orthogonally with respect to the at least one first contact region.

7. The battery system according to claim 1, further comprising a plurality of heat conducting elements, wherein each heat conducting element of the plurality of heat conducting elements is arranged between at least every second battery cell of the plurality of battery cells.

8. The battery system according to claim 1, wherein:
the apparatus configured to control the temperature of the battery cells includes two hollow bodies through which a coolant flows, and
wherein the at least one heat conducting element includes two second contact regions, the second contact regions arranged on mutually opposite sides of the heat conducting element, and each of the second contact regions arranged on the hollow bodies such that the hollow bodies are secured by the second contact regions.

9. A battery system, comprising:
a plurality of battery cells connected to one another; and
an apparatus configured to control a temperature of the battery cells, the apparatus including:
at least one hollow body through which a coolant flows; and
at least one heat conducting element having at least one first contact region and at least one second contact region,
wherein the at least one first contact region has a planar configuration and is in thermal contact with a side face of at least one battery cell of the plurality of battery cells,
wherein the at least one second contact region is arranged on the at least one hollow body such that the at least one second contact region is in thermal contact with the at least one hollow body,
wherein the at least one second contact region is configured to enclose the at least one hollow body at least partially, and
wherein the at least one second contact region is arranged on the at least one hollow body by being shrunk on.

* * * * *